United States Patent
Shen et al.

(10) Patent No.: US 10,713,313 B2
(45) Date of Patent: Jul. 14, 2020

(54) INTERNET QUESTION ANSWERING SYSTEM AND METHOD, AND COMPUTER READABLE RECORDING MEDIA

(71) Applicant: INDUSTRIAL TECHNOLOGY RESEARCH INSTITUTE, Hsinchu (TW)

(72) Inventors: Min-Hsin Shen, Taichung (TW); Ching-Hsien Li, Kaohsiung (KR); Chung-Jen Chiu, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 604 days.

(21) Appl. No.: 14/983,456

(22) Filed: Dec. 29, 2015

(65) Prior Publication Data

US 2017/0169115 A1    Jun. 15, 2017

(30) Foreign Application Priority Data

Dec. 9, 2015  (TW) .............................. 104141358 A (51) Int. Cl.
*G06F 16/9535* (2019.01)
*G06F 16/9032* (2019.01)
(Continued)

(52) U.S. Cl.
CPC .... *G06F 16/9535* (2019.01); *G06F 16/90332* (2019.01); *G06F 40/30* (2020.01); *G06F 40/35* (2020.01)

(58) Field of Classification Search
CPC ............... G06F 17/2785; G06F 17/279; G06F 16/3329; G06F 16/243; G06F 16/90332
See application file for complete search history.

(56) References Cited

U.S. PATENT DOCUMENTS 7,640,164 B2    12/2009 Sasaki et al.
8,204,751 B1 *  6/2012 Di Fabbrizio ........ G06F 17/271
                                                    704/256
(Continued)

FOREIGN PATENT DOCUMENTS

CN        101030267 A       9/2007
CN        101097573 A       1/2008
(Continued)

OTHER PUBLICATIONS

Taiwanese Office Action dated May 19, 2016.
(Continued)

*Primary Examiner* — William Spieler
(74) *Attorney, Agent, or Firm* — Rabin & Berdo, P.C.

(57) ABSTRACT

An internet question answering method is applied in an internet question answering system. A current-turn user question is received. Based on a discourse labeling model, a discourse of the current-turn user question is labeled as "discourse continue" or "discourse end" online and real-time. Based on the discourse of the current-turn user question, whether to clear at least one discourse of an old boundary is determined. The internet question answering system answers the current-turn user question. A match degree between a next-turn user question and the segment of the dialog log is compared to determine whether the discourse of the current-turn user question is correct, whether to correct the discourse of the current-turn user question, and whether to adjust the discourse labeling model by using the current-turn user question.

21 Claims, 10 Drawing Sheets

(51) Int. Cl.
*G06F 40/30* (2020.01)
*G06F 40/35* (2020.01)

(56) References Cited

U.S. PATENT DOCUMENTS

| | | | |
|---|---|---|---|
| 8,676,824 | B2 | 3/2014 | Tavor |
| 8,762,154 | B1 | 6/2014 | Witt-ehsani |
| 8,914,288 | B2 | 12/2014 | Williams et al. |
| 2002/0156809 | A1 | 10/2002 | O'Brien |
| 2005/0182625 | A1* | 8/2005 | Azara ............... G06F 17/279 704/236 |
| 2014/0122618 | A1 | 5/2014 | Duan |
| 2014/0372419 | A1 | 12/2014 | Li et al. |
| 2015/0332168 | A1* | 11/2015 | Bhagwat ............ G06F 3/0481 706/12 |
| 2016/0180038 | A1* | 6/2016 | Clark ............. G06F 16/24573 706/12 |

FOREIGN PATENT DOCUMENTS

| | | |
|---|---|---|
| CN | 101630450 A | 1/2010 |
| CN | 102467541 A | 5/2012 |
| CN | 103279528 A | 9/2013 |
| TW | 201019288 A | 5/2010 |
| TW | 201327214 A1 | 7/2013 |
| TW | 201502822 A | 1/2015 |
| TW | 201519064 A | 5/2015 |
| TW | 201535157 A | 9/2015 |

OTHER PUBLICATIONS

Learning decision trees to determine turntaking by spoken dialogue systems—Ryo Sato, Ryuichiro Higashinaka, Masafumi Tamoto, Mikio Nakano, Kiyoaki Aikawa—2002—in Proceedings of ICSLP-02; NTT Communication Science Laboratories, NTT Corporation.
Chinese Office Action dated Sep. 4, 2019.

* cited by examiner

| online sentence turn | real-time discourse label |
|---|---|
| System: Welcome to the Movie Master. Which movie do you want to search for? | DC |
| User: I want to search for love movies | DC |
| System: Ghost | DE |
| User: Are there any movies directed by Steven Spielberg? | DC |
| System: I found some movies directed by Steven Spielberg | DC |
| User: Are there any movies acted by Arnold Schwarzenegger? | DC |
| System: I found one movie directed by Steven Spielberg and acted by Arnold Schwarzenegger. Do you want to search for other movies? | DC |
| ... | |

FIG. 5

| online sentence turn | real-time discourse label |
|---|---|
| System: Welcome to the Movie Master. Which movie do you want to search for? | DC |
| User: I want to search for love movies | DC |
| System: Ghost | DE ~610 |
| User: Are there any movies directed by Steven Spielberg? | DC |
| System: I found some movies directed by Steven Spielberg | DC |
| User: Are there any movies acted by Arnold Schwarzenegger? | DC |
| System: I found one movie directed by Steven Spielberg and acted by Arnold Schwarzenegger. Do you want to search for other movies? | DC |
| ... | |

620 points to the top dashed region. 641, 642, 643, 644 label the four middle rows, bracketed as 640.

FIG. 6

| online sentence turn | real-time discourse label |
|---|---|
| System: Welcome to the Movie Master. Which movie do you want to search for? | DC |
| User: Are there any movies directed by Steven Spielberg? | DC |
| System: I found some movies directed by Steven Spielberg | DC |
| User: Are there any movies acted by Arnold Schwarzenegger? | DC |
| System: I found one movie directed by Steven Spielberg and acted by Arnold Schwarzenegger. Do you want to search for other movies? | DC |
| User: Are there any action movies? | DC |
| System: I found some action movies | DE — 730 |
| User: Are there any movies directed by Steven Spielberg and acted by Arnold Schwarzenegger? | |

INTERNET QUESTION ANSWERING SYSTEM AND METHOD, AND COMPUTER READABLE RECORDING MEDIA

CROSS-REFERENCE TO RELATED ART

This application claims the benefit of Taiwan application Serial No. 104141358, filed Dec. 9, 2015, the disclosure of which is incorporated by reference herein in its entirety.

TECHNICAL FIELD

The disclosure relates in general to an internet question answering system and a method, and a computer readable recording media.

BACKGROUND

Internet plays an important role in people life. For example, the user may search for the desired product or movies on the internet question answering system or internet search engine (for example, Google) for quick search.

Therefore, the application provides an internet question answering system and method which provides intelligent question answering experience to meet user requirement.

SUMMARY

The disclosure is directed to an internet question answering system and a method, and a computer readable recording media. According to a user dialog log, a discourse label model is learned and trained via internet question answering function, to provide intelligent question answering experience.

According to one embodiment, an internet question answering method for an internet question answering system is provided. A current-turn user question is received. A discourse of the current-turn user question is labeled as "discourse continue (DC)" or "discourse end (DE)" online and real-time based on a discourse labeling model. Whether to clear at least one discourse of an old boundary is determined based on the discourse of the current-turn user question. The current-turn user question is answered by the internet question answering system. A match degree between a next-turn user question and the old boundary is compared to determine whether the discourse of the current-turn user question is correct, whether to correct the discourse of the current-turn user question, and whether to adjust the discourse labeling model by using the current-turn user question.

According to another embodiment, an internet question answering system is provided. The internet question answering system includes an online and real-time sentence discourse labeling module, a discourse clearing and answering module, a comparison module, a discourse label correction module and a discourse label model adjustment module. The online and real-time sentence discourse labeling module is for labeling a discourse of a current-turn user question as "discourse continue (DC)" or "discourse end (DE)" online and real-time based on a discourse label model. The discourse clearing and answering module is for determining whether to clear at least one discourse of an old boundary based on the discourse of the current-turn user question, and for answering the current-turn user question. The comparison module is for comparing a match degree between a next-turn user question and the old boundary to determine whether the labeled discourse of the current-turn user question is correct or not. The discourse label correction module is for determining whether to correct the discourse of the current-turn user question based on a determination result of the comparison module. The discourse label model adjustment module is for determining whether the current-turn user question is used in adjusting the discourse label model based on the determination result of the comparison module.

According to an alternative embodiment, a non-transitory computer-readable recording media storing a program is provided. When a computer loads and executes the program, the internet question answering method described above is executed.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

In the internet question answering system and method which automatically detect the discourse label of the user question, the question answering information (including the question answering log, the past dialog clearance time, the question answering turn record, the user idle time, the user browsing record and the user transaction record) between the user and the internet question answering system is recorded. A dialog contains at least one question and an answer. The discourse label is classified by two labels, i.e. a discourse end (DE) and a discourse continue (DC).

The internet question answering system and method of the embodiment of the application may combine the discourse end event and the user dialog log as training data to train the discourse label model based on the training data.

When the discourse is labeled as the discourse end and the confidence value of this labeling is within the confidence range, the discourse for the current dialog is cleared and the question answering is continued. Otherwise, the discourse for the current dialog is kept.

Further, the internet question answering system and method of the embodiment of the application may compare the current sentence with the question answering record in the user dialog log, to determine whether the sentence belongs to a related discourse. The sentence is the content in the interaction between the user and the internet question answering system. For example but not limited by, the sentence can be a text sentence, sub-sentence, phrase, word or a spoken utterance input. If yes, the discourse label is corrected and fed back to the user dialog log. If the number of the feedback information is over a threshold, the internet question answering system and method of the embodiment of the application may automatically train the discourse label model again.

Figure 1:
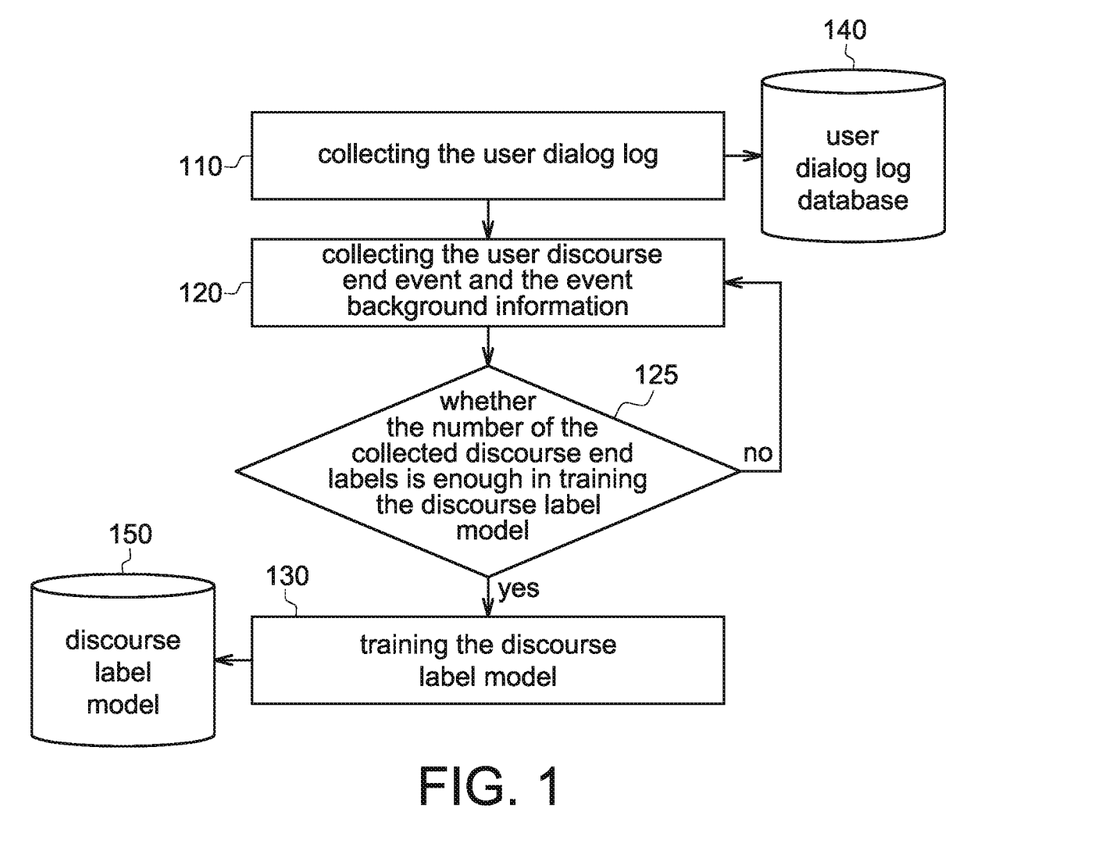
FIG. 1 shows a flow for training a discourse label model according to an internet question answering system and an internet question answering method of an embodiment of the application.

In the internet question answering system and method of the embodiment of the application, the discourse label model is trained in advance. FIG. 1 shows a flow for training the discourse label model according to an internet question answering system and method of an embodiment of the application.

In step 110, the user dialog log is collected to record the question answering information of the user and the internet question answering system. The collected user dialog log is recorded into the user dialog log database 140.

In step 120, the user discourse end event and the event background information are collected.

In an embodiment of the application, the user discourse end event includes for example but not limited by, any one or the combination thereof: (1) a reset-icon-pressed-by-user event; (2) a user transaction event; (3) a user browse event; and (4) an idle-period-over-threshold event.

In an embodiment of the application, the internet question answering system tracks whether the user presses the reset icon. If the user presses the reset icon, it represents that the current discourse is discourse end. The internet question answering system collects the discourse end event to generate a discourse end label. That is, once the user presses a reset icon, a discourse end label is generated.

In an embodiment of the application, the internet question answering system tracks whether the user triggers a transaction event after the user asks a question. The transaction event is for example but not limited by, payment and adding the product in internet shopping cart. If the user transaction event is triggered, it represents that the current discourse is discourse end. The internet question answering system collects the discourse end event to generate a discourse end label. That is, once the user triggers the user transaction event, a discourse end label is generated.

In an embodiment of the application, the internet question answering system tracks whether the user browses (for example, the products or news) after the user asks a question. If the user browse event is triggered, it represents that the current discourse is discourse end. The internet question answering system collects the discourse end event to generate a discourse end label. That is, once the user triggers the user browse event, a discourse end label is generated.

In an embodiment of the application, the internet question answering system may actively count the user idle period (the user idle period referring to the period during which the user idles and does not have interaction with the internet question answering system) to determine whether the user idle period is over a threshold. If yes, it represents that the current discourse is discourse end. The internet question answering system collects the discourse end event to generate a discourse end label. That is, once the user idle period is over the threshold, a discourse end label is generated.

The event background information collected in the step 120 refers to the background information of the user discourse end event. For example but not limited, the event background information includes the reset time, the question answering turn record, the user idle period, the user browse record and the user transaction record.

Figure 2:
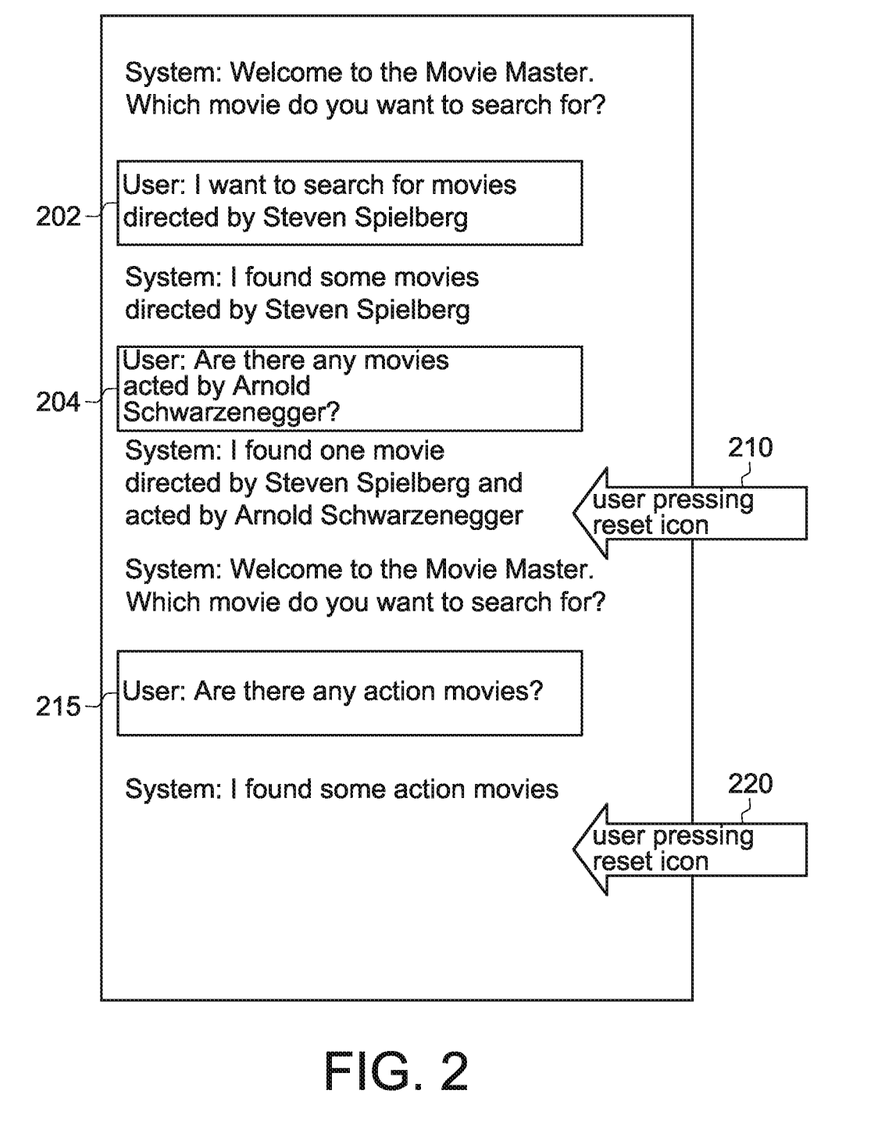
FIG. 2 shows an example for collecting a user dialog log and a user discourse end event according to an internet question answering system and an internet question answering method of an embodiment of the application.

FIG. 2 shows an example for collecting a user dialog log and a user discourse end event according to an internet question answering system and method of an embodiment of the application. The internet question answering system collects user dialog logs 202, 204 and 215, and collects user discourse end events 210 and 220.

In the step 125, the internet question answering system determines that whether the number of the collected discourse end labels is enough in training the discourse label model. If yes, the flow proceeds to step 130; and if no, the flow returns to the step 120.

In the step 130, the discourse label model 150 is trained. As described above, the user discourse end event and the user dialog log are as the training data. In discourse labeling, the discourse is labeled as the discourse end (DE) or the discourse continue (DC), and a corresponding confidence value is also labeled. That is, when the user is active with the internet question answering system, as for the discourse of each user sentence, the discourse of the user sentence is labeled as DE or DC, and a corresponding confidence value is also labeled.

Details of training the discourse label model 150 are as follows.

An example of the train data (including the user discourse end event and the user dialog log) is shown in Table 1.

TABLE 1

| Sentence turn | Sentence | Discourse label |
|---|---|---|
| 1 | User: I want to search for movies directed by Steven Spielberg. | DC |
| 2 | System: I found some movies directed by Steven Spielberg. | DC |
| 3 | User: Are there any movies acted by Arnold Schwarzenegger? | DC |
| 4 | System: I found some movies directed by Steven Spielberg and acted by Arnold Schwarzenegger. Do you want to search for other movies? | DC |
| 5 | User: Are there any action movies? | DC |
| 6 | System: I found some action movies. | DC |

TABLE 1-continued

| Sentence turn | Sentence | Discourse label |
|---|---|---|
| 7 | User: Are there action movies directed by Steven Spielberg and acted by Arnold Schwarzenegger? | DC |
| ... | ... | ... |

In an embodiment of the application, "sentence turn" refers to the sentence in the interaction between the user and the internet question answering system. The discourse label is related to the sentence. For example, the sentence (User: I want to search for movies directed by Steven Spielberg) in the first sentence turn is labeled as DC.

The input into the trained discourse label model includes the current sentence and the old sentences, for example, the fourth sentence and the old sentences (the first to the third sentences). Or, the input into the trained discourse label model includes the current sentence but not the old sentences.

In an embodiment of the application, the training steps for training the discourse label model includes but not limited by, a feature extraction step, a feature weight transformation step and a model parameter learning step.

In an embodiment of the application, the types of the feature include linguistic feature and meta feature. The feature extraction step extracts the linguistic feature and/or the meta feature from the sentence sets.

The linguistic feature is the feature which is able to be expressed by text in the sentence set. For example but not limited by, the linguistic feature includes: (1) the keywords, the morphological features, the semantic concepts, the sentence types, the implied topics and so on in the current sentence; (2) whether the actors, the directors, the years, the types and so on appear in the current sentence; (3) the keywords, the morphological features, the semantic concepts, the sentence types, the implied topics and so on in the old sentence turn set; and (4) whether the actors, the directors, the years, the types and so on appear in the old sentence turn set.

The meta feature is the behavior in the discourse but not features covered by text. For example but not limited by, the meta feature includes (1) the non-semantic content information of the current sentence turn, for example, the discourse end time, the question answering turn record, the number of the question answering turns, the user idle period, the user browse record, and the transaction record; and (2) the non-semantic content information of the old sentence turn set, for example, the discourse end time, the question answering turn record, the number of the question answering turns, the user idle period, the user browse record, and the transaction record.

After the features are extracted, the features may be assigned by different weights for feature weight transformation. One example of weight assignment is a binary feature. For example, if the term "Arnold Schwarzenegger" appears, the weight is set as 1; and on the contrary, if the term "Arnold Schwarzenegger" does not appear, the weight is set as 0. Alternatively, the feature is related to the term appearance frequency. For example, if the term "Arnold Schwarzenegger" appears twice in the sentence, the weight is set as a ratio of 2 divided by F, F referring to the appearance frequency of the total terms. Of course, the term frequency-inverse document frequency (TF-IDF) weight calculation algorithm is applicable in other embodiment of the application. The application is not limited by the weight assignment algorithm.

After feature extraction and feature weight transformation, in an embodiment of the application, a classifier is trained to classify the DC and DE. The embodiment of the application may use the common classifier, for example but not limited, SVM (support vector machine) classifier, the Bayesian classifier, the artificial neural network classifier, the decision tree classifier or the k-nearest neighbors classifier. The training of the classifier refers to that the best coefficient related to the features of the different class (DC and DE) is calculated based on the discourse training data. The coefficient is refer to the parameters of the classifier or clustering model in general. SVM is taken as an example for description of the embodiment of the application, which is not to limit the application.

$$\min_{w,b,\xi} \frac{1}{2} w^T w + c \sum_{i=1}^{l} \xi_i \quad (1)$$

subject to $y_i(w^T \phi(x_i) + b) \geq 1 - \xi_i$ $\xi_i \geq 0, i=1, \ldots, l$ In the equation (1), the "i", ranging from 1 to l, refers to the number of each train data. The "$y_i$" is 1 or −1, which refers to the class label of each train data. The train data $x_i$ may be expressed as an vector, "b" is the bias, "w" is the weight vector of the optimum hyperplane, the hyperplane is composed of b and w, "ξ" is the slack variable which represents the slack allowable in the restriction, and "c" is used to control the weight of the slack between the optimum hyperplane and the restriction.

After the discourse label model is trained, the vector W is obtained. As for the sentence input by the user, after the feature weight vector is obtained by the feature extraction step and the feature weight transformation step, the classifier is used to predict whether the sentence input from the user is labeled as DC or DE. That is, the prediction is calculated by the vector W and the formula (2):

$$\text{sgn}(W^T x + b) \quad (2)$$

In the formula (2), the parameter "x" refers to the data vector, the parameter "b" is the bias of the hyperplane as in the formula (1), W is the weight vector in the optimum hyperplane as in the formula (1); and sgn is a sign function.

The vector X in formulas (1) and (2) is the feature weight vector obtained in the feature extraction step and feature weight transformation step.

The discourse train data in the Table 1 is taken as an example to explain that there is usually a sequence between the sentences or the discourse labels. For example, after three continuous DCs, the next discourse may be the discourse end (DE). Alternatively, if the director concept term appears in the previous sentence, the actor concept term may appear in the next sentence.

Thus, in an embodiment of the application, in addition to train the discourse label model by the classifier, the sequence learning model, for example but not limited by, CRFs (Conditional Random Fields, CRFs) or HMM (Hidden Markov Model, HMM), may be also used.

Figure 3:
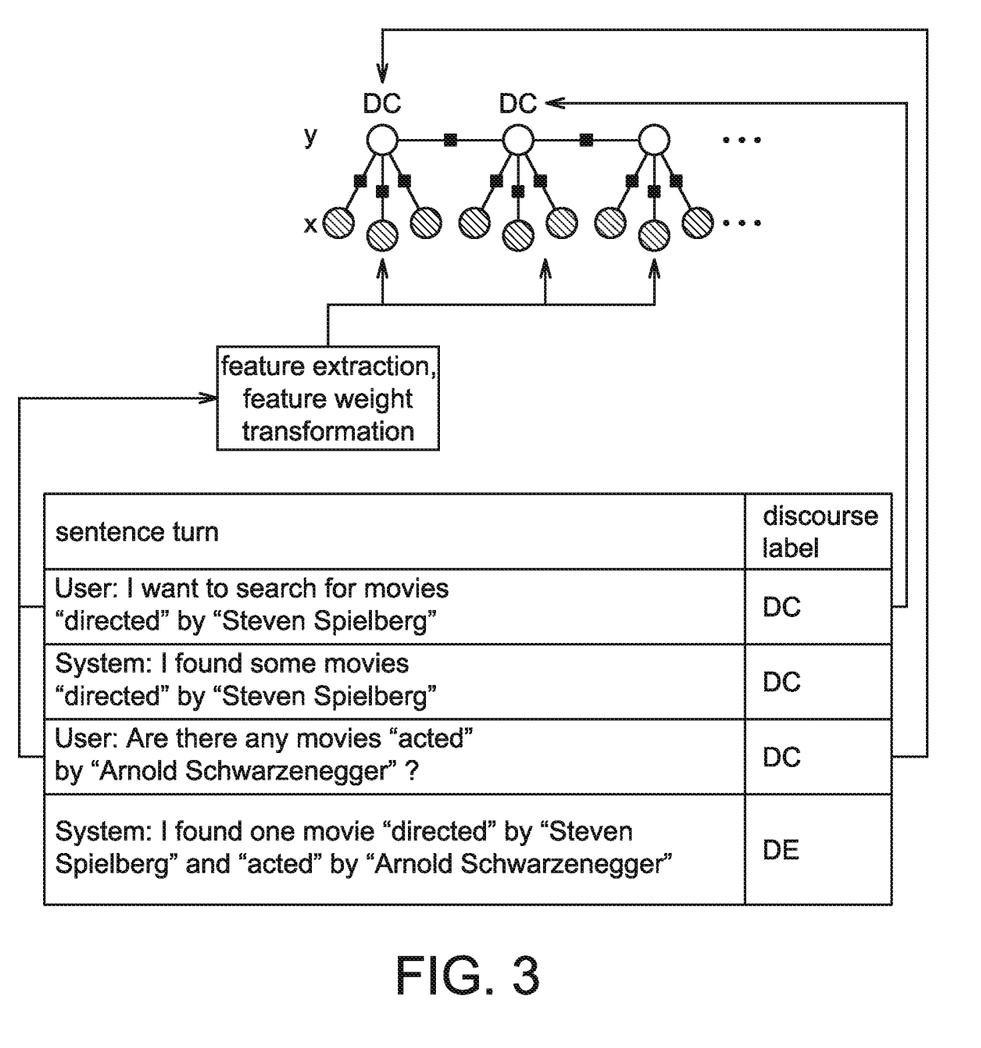
FIG. 3 shows an example for obtaining a feature correspondence coefficient according to an internet question answering system and an internet question answering method of an embodiment of the application.

FIG. 3 shows an example for obtaining feature correspondence coefficient by linear chain CRFs according to an internet question answering system and method of an embodiment of the application. As shown in FIG. 3, the sentence sequence in the sentence turns is set as sequence "x". The vector of sequence x is obtained in the feature extraction step and the feature weight transformation step. The feature function specified in the CRFs is also used, wherein the feature may include the linguistic feature and the meta feature. An optimum calculation algorithm, for example but not limited by, a Gradient Descent, is performed on the discourse label sequence y to obtain the feature correspondence coefficient λ, which is shown as the rectangular solid block in FIG. 3.

The above process may be expressed in formulas (3), (3.1) and (3.2).

$$p(y \mid x) = \frac{1}{Z(x)} \exp\left\{ \sum_{k=1}^{K} \lambda_k, f_k(y_t, y_{t-1}, x_t) \right\} \quad (3)$$

$$\{f_k(y_t, y_{t-1}, x_t)\}_{k=1}^{K} \quad (3.1)$$

$$Z(x) = \sum_{y} \exp\left\{ \sum_{k=1}^{K} \lambda_k f_k(y_t, y_t - 1, x_t) \right\} \quad (3.2)$$

In the formulas (3), (3.1) and (3.2), "x" refers to the input node set which is the input sequence that can be observed, for example, a sentence sequence. "y" refers to the hidden states sequence corresponding to "x", i.e. the label sequence. For example, "y" is a discourse label sequence corresponding to a sentence sequence. P(y|x) is a conditional probability of the discourse label sequence given the sentence sequence in the whole data. $\lambda_k \in R^K$ is the parameter vector which is optimized by the CRFs model. "fk" is a feature function set used by the CRFs model. "K" is an index of the feature function. "Exp" is an exponential function. Z(x) is a normalization function.

The coefficient λ in the formulas (3), (3.1) and (3.2) is the feature correspondence coefficient (i.e. the rectangular solid block in FIG. 3). This model is helpful in training and learning data having sequence relationship.

Thus, after the discourse train data having discourse labels is collected, the embodiment of the application may train and obtain the discourse label model by the feature extraction step, the feature weight transformation step and the model parameter learning step (by the classifier or by the sequence learning model).

Further, if the train data includes some discourse labels, in an embodiment of the application, semi-supervised learning may be used to expand the model parameter learning step. Alternatively, if during the collection of the discourse train data, more discourse related variables are found and these variables may be useful in establishing the model, the common probabilistic graphical model is used to expand the sequence learning model.

Figure 4:
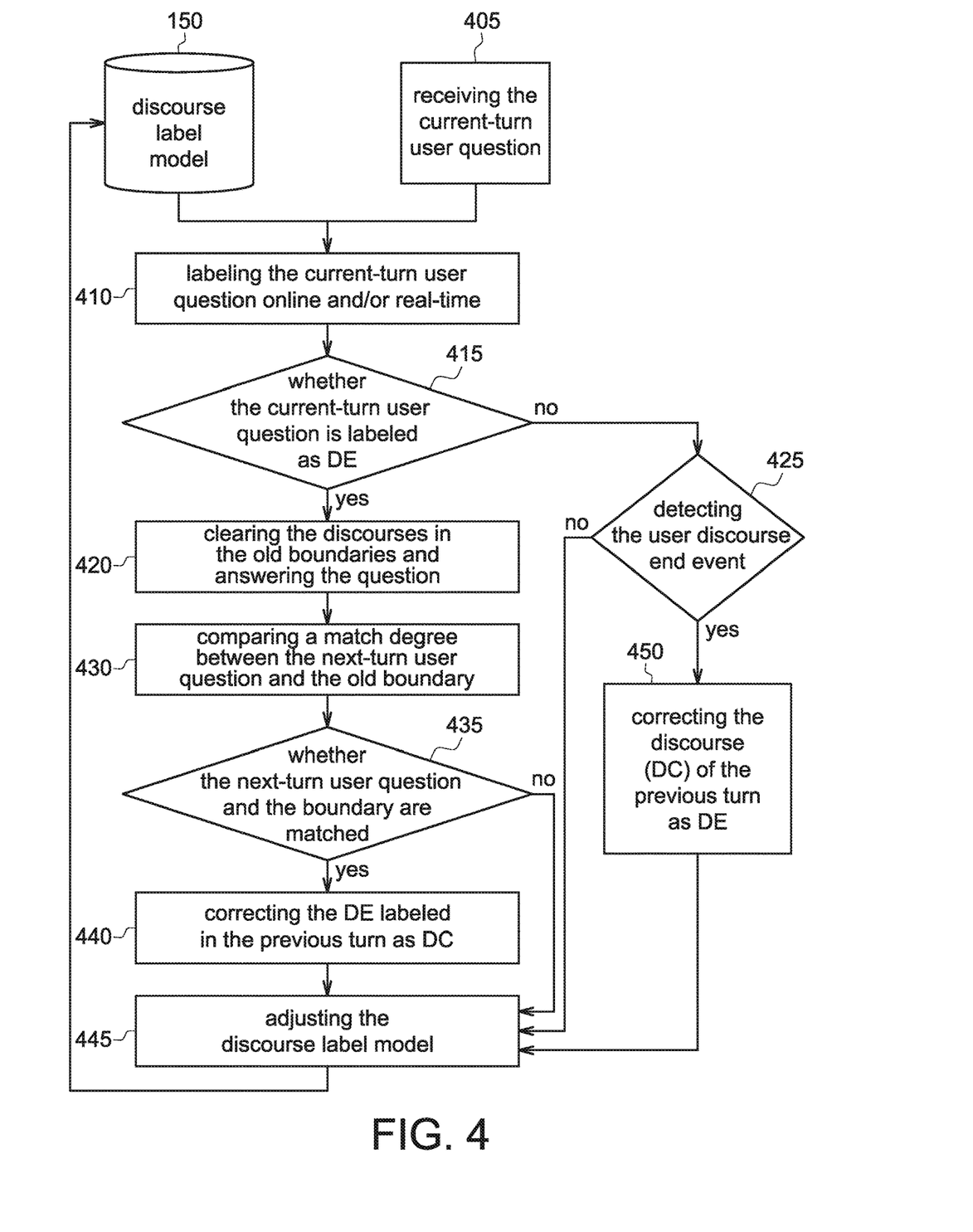
FIG. 4 shows a flow of an internet question answering method of an embodiment of the application.
Figure 5:
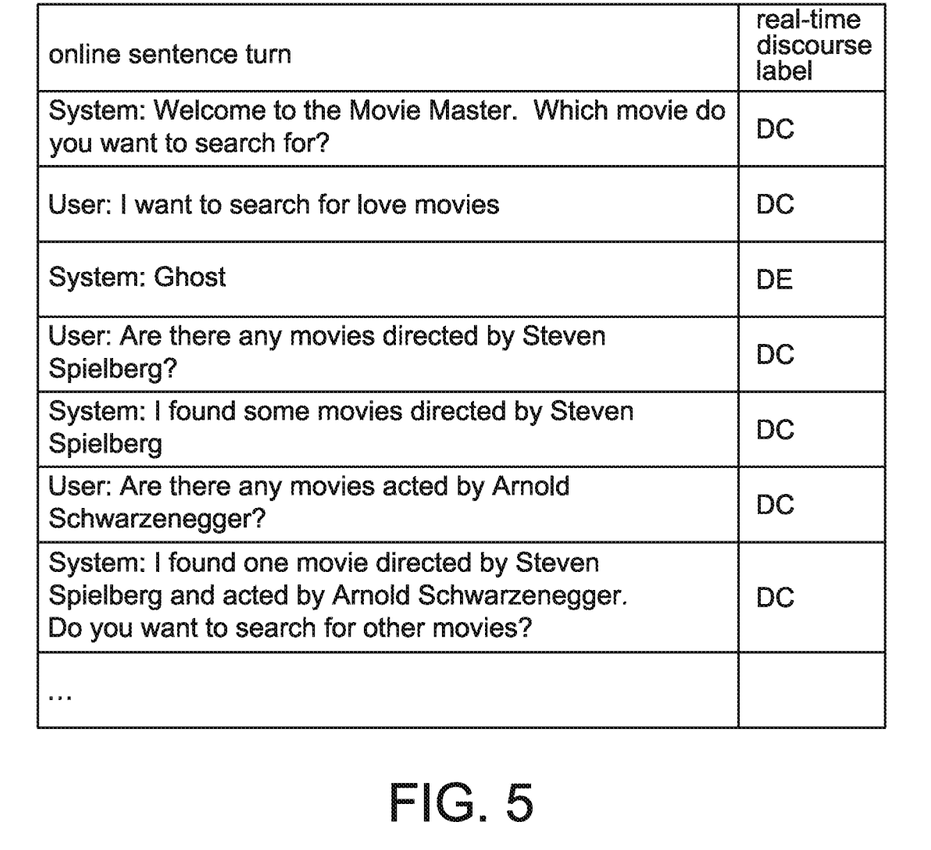
FIG. 5 shows an example for labeling the discourse of the current-turn user question on-line and real-time according to an embodiment of the application.

FIG. 4 shows a flow of the internet question answering method used in an internet question answering system of an embodiment of the application. In step 405, the current-turn user question is received. In step 410, the current-turn user question is labeled as DC or DE online and/or real-time. For example, the current-turn user question is real-time labeled as DC or DE based on the discourse label model 150, and the confidence value is also labeled. FIG. 5 shows an example for labeling the discourse of the current-turn user question on-line and real-time of an embodiment of the application. As shown in FIG. 5, as for the sentence in each turn (no matter the question from the user or the answers from the internet question answering system), the sentence in each turn may be online labeled as DC or DE in an embodiment of the application.

In step 415, it is determined that whether the current-turn user question is labeled as DE. That is, it is determined that the current-turn user question is labeled as DE or DC. If yes in step 415 (the current-turn user question is labeled as DE), then the flow proceeds to step 420. If no in step 415 (the current-turn user question is labeled as DC), then the flow proceeds to step 425.

In step 420, the discourses in the old boundaries are cleared and the question is answered. Because the discourse of the current-turn user question is labeled as DE, the discourses in the old boundaries are cleared and the question is answered. The old boundary is composed of sentence turns which are not cleared and earlier than or equal to the current-turn user question and system answer.

Besides, if the discourse of the current-turn user question is labeled as DC, then the discourse is not cleared and the user question is also answered. That is, based on whether the discourse of the current-turn user question is labeled as DC or DE, whether to clear the discourses in the old boundaries is determined.

Figure 6:
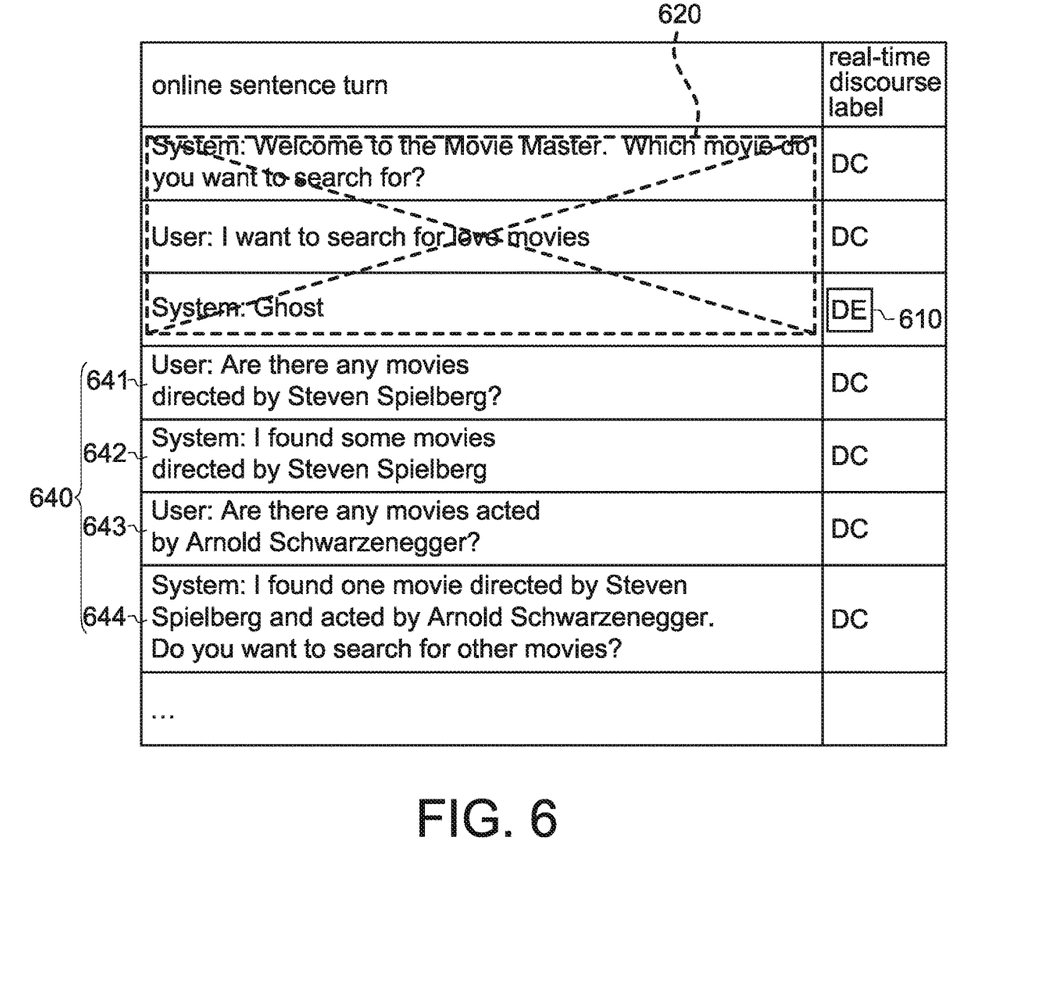
FIG. 6 shows an example for clearing the discourse of the old boundary and for answering the current-turn user question according to an embodiment of the application.

FIG. 6 shows an example for clearing the discourse of the old boundary and for answering the current-turn user question of an embodiment of the application. As shown in FIG. 6, because the discourse 610 of the user question is labeled as DE, the internet question answering system clears the discourses in the old boundary 620.

"Boundary clearance" refers to that, the internet question answering system clears the discourses in the old boundary 620 and then, when the internet question answering system answers the next user question, the internet question answering system does not consider the dialog log and discourses in the old boundary 620.

In an embodiment of the application, the term "segment" refers to the sentence turns between two continuous DEs. DE may refer to the DE determined by the internet question answering system or the user discourse end event trigger by the user and detected by the internet question answering system. Clearance of the old boundary means to clear the discourse information (including linguistic text information and meta information) of the old boundary. The linguistic text information includes at least one sentence of the boundary, the keywords, the morphological features, the semantic concepts, the sentence types, the implied topics, the actors, the directors, the years, the types and so on in the sentence. The meta information includes the non-semantic content information of the current discourse, for example, the discourse end time, the user idle period, the user browse record, and the transaction record.

As shown in FIG. 6, the internet question answering system considers the sentence turns 641-644 as the same boundary 640, wherein the sentence turns 641-644 are labeled as DC. For example, in answering the user sentence turn 643, the internet question answering system considers the sentence turns 641-643 in the sentence turn 644, but does not consider the sentence turns in the old boundary 620. On the contrary, if the user history sentence turn is not considered, in answering the user question "are there any movies acted by Arnold Schwarzenegger", the internet question answering system may answer "I found one movie acted by Arnold Schwarzenegger", rather than the sentence turn 644 of FIG. 6 "I found one movie directed by Steven Spielberg and acted by Arnold Schwarzenegger".

In step 430, if the user inputs another question in the next turn, a match degree between the next-turn user question and the old boundary is compared.

The comparison in step 430 is by for example, discourse similarity analysis level (to analyze word level or concept level) algorithm or similarity calculation algorithm (Jaccard, Cosine etc.).

In step 435, it is determined that whether the next-turn user question and the boundary are matched, to determine the DE labeled in the previous turn is correct or not.

If yes in step 435 (the next-turn user question and the boundary are matched, which means the user inputs the next-turn user question following the sentence/meaning of the old boundary), then it is determined that the DE labeled in the previous turn is corrected as DC (step 440) and the discourse label model is adjusted (step 445). Details of adjusting the discourse label model are as follows.

If no in step 435 (which means that the next-turn user question from the user is not following the sentence/meaning of the old boundary), then it is determined that the DE labeled in the previous turn (for example, the DE 610 in FIG. 6) is right and the discourse label model is adjusted (step 445).

Figure 7:
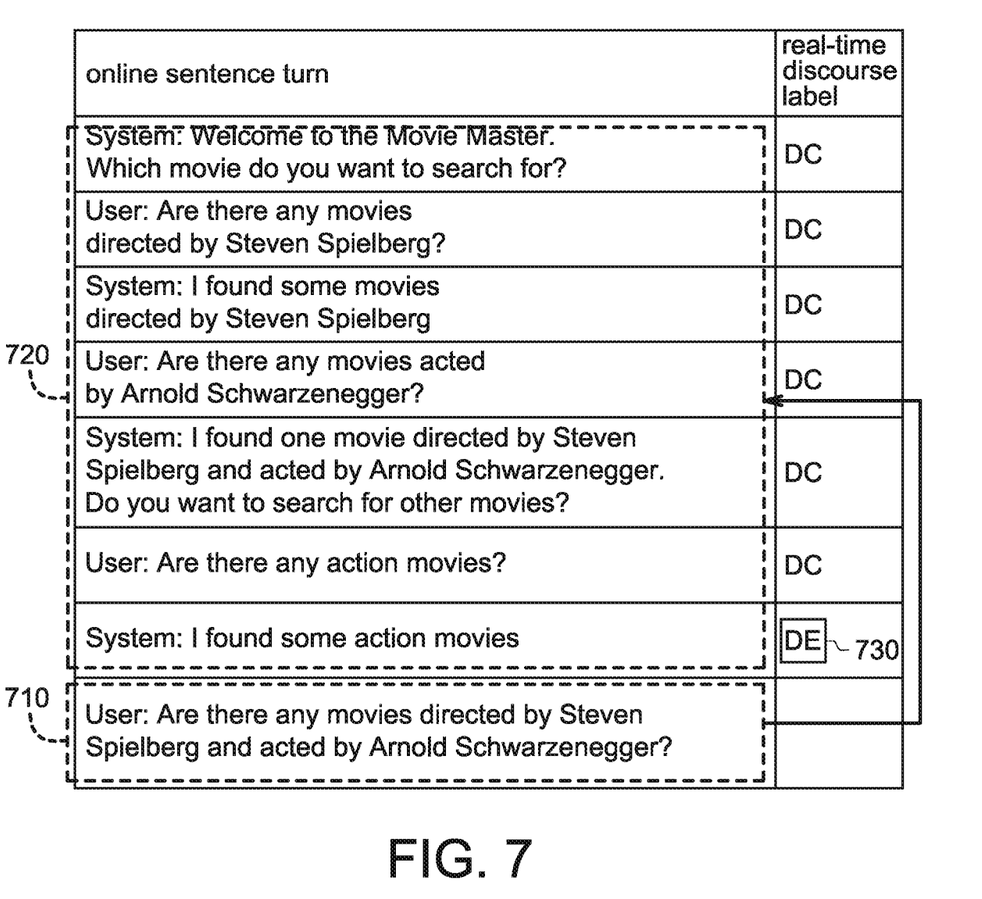
FIG. 7 shows an example for comparing the match degree between the next-turn user question and the segment of the user dialog log to determine whether to correct the discourse end labeled in the previous turn according to an embodiment of the application.

FIG. 7 shows an example for comparing the match degree between the next-turn user question and the segment (the old boundary) of the user dialog log to determine whether to correct the discourse end labeled in the previous turn of an embodiment of the application. As shown in FIG. 7, the net-turn user question is compared with the old boundary 720. From FIG. 7, it is clear that the user asks the next-turn question by following the meaning of the old boundary 720. Thus, it is wrong to label the discourse 730 of the previous-turn user question as DE and the discourse 730 should be corrected as DC. If the net-turn user question is not matched with the old boundary 720, the DC 730 is not corrected.

In step 425, it is determined that whether the user discourse end event is detected. That is, if the internet question answering system labels the discourse of the current-turn user question as DC, the internet question answering system detects whether the user actively ends the discourse by detecting whether the following possible user discourse end event appear: (1) a reset-icon-pressed-by-user event; (2) a user transaction event; (3) a user browse event; and (4) an idle-period-over-threshold event.

If yes in step 425, this means that it is wrong to label the discourse of the previous turn as DC. In an embodiment of the application, the discourse (DC) of the previous turn is corrected as DE in step 450 and the discourse label model is adjusted (step 445). That is, if the discourse of the current-turn user question is labeled as DC and a user discourse end event is detected, the discourse of the current-turn user question is corrected as DE.

If no in step 425, it is correct to label the discourse of the previous turn user question as DC. The discourse label model is adjusted in step 445.

Details of adjusting the discourse label model 150 are as follows.

In training, each train data may be assigned by different weight. Assignment of different weight may have different effects on training of the discourse label model. The model training may be also referred as model parameter learning or estimating.

In an embodiment of the application, based on the confidence value of the discourse label and the match degree (which represents the match degree between the current user question and the old boundary), the weight is adjusted. For example, if the internet question answering system determines that the confidence value of DC is 0.8 and the match degree between the current user question and the old boundary is 0.6, the weight may be the average (0.7) of the two values (0.8 and 0.6).

Besides, in an embodiment of the application, via self-training of the semi-supervised learning, the online discourse label model feeds back the sentence having high confidence prediction result to the training data set.

In another, in an embodiment of the application, based on graph-based semi-supervised algorithm, the similarity matrix between the sentences may be established to propagate the labels to other unlabeled sentences for discourse label model adjustment.

Further, in an embodiment of the application, the domain adaption algorithm or the transfer learning algorithm may be used to adjust the parameters of the discourse label model. For example, the $\lambda$ coefficient may be divided into the test domain (i.e. the sentence turns collected via the online discourse labeling) and the original training data domain. As for the collected train data, an expectation-maximization algorithm may be used to optimize the formula (3), and the $\lambda$ coefficient obtained in the test domain is the coefficient after domain adjustment, which may be used in discourse label model for discourse labeling.

Further, in an embodiment of the application, via the adaptive generative features, for example, topic models such as Latent Dirichlet Allocation (LDA), unlabeled data and labeled data may be mixed to train the topic model. The parameters (for example, the distribution probability from topic model of the mixed data may be used as new features to expand the features of the discourse label model for discourse label model adjustment.

Figure 8:
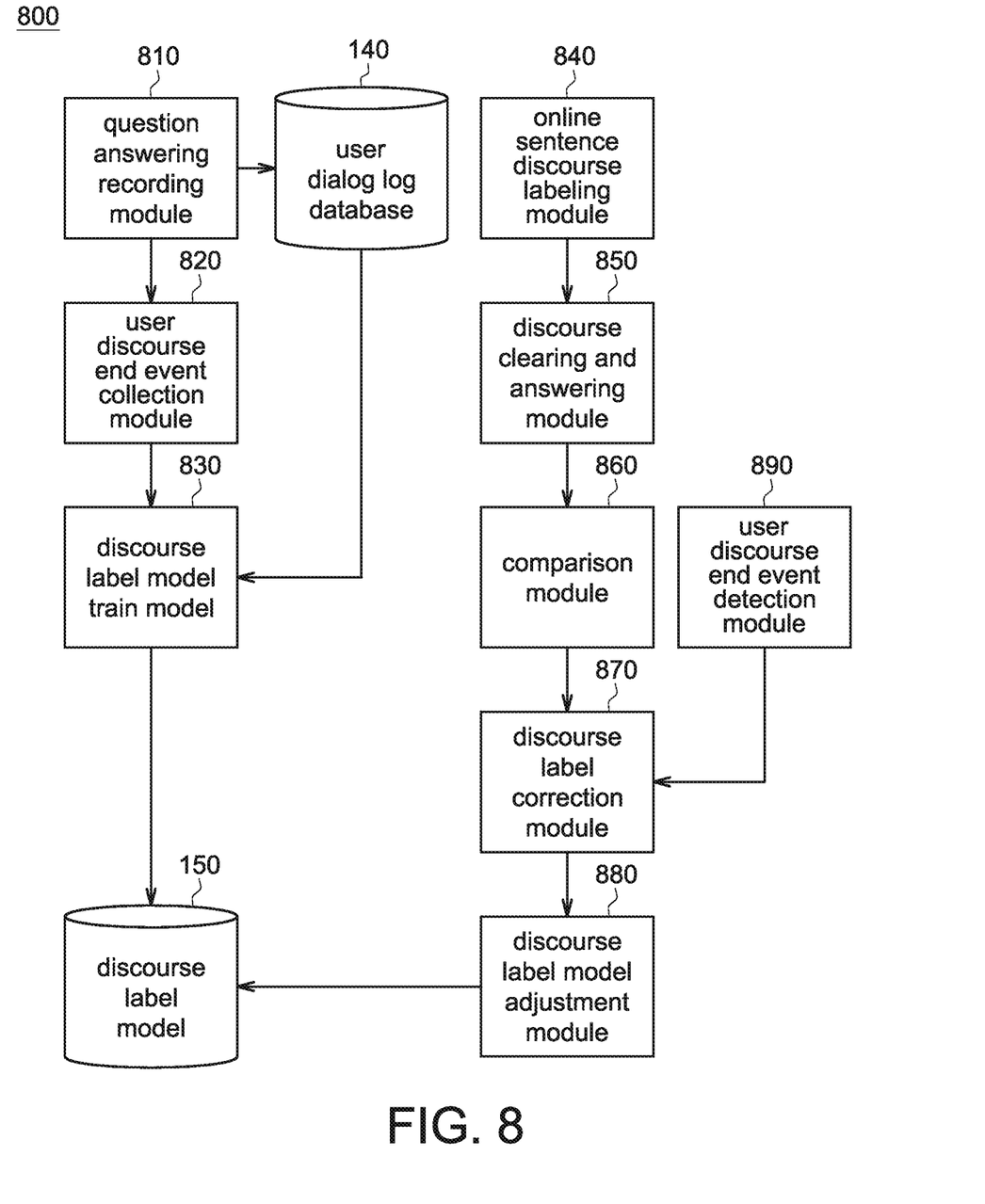
FIG. 8 shows a function block diagram of the internet question answering system according to another embodiment of the application.

Another embodiment of the application discloses an internet question answering system which may automatically detect the segment boundary. FIG. 8 shows a function block diagram of the internet question answering system of the embodiment of the application. As shown in FIG. 8, the internet question answering system 800 for automatically detecting the segment boundary according to the embodiment of the application includes: a question answering recording module 810, a user discourse end event collection module 820, a discourse label model train model 830, an online sentence discourse labeling module 840, a discourse clearing and answering module 850, a comparison module 860, a discourse label correction module 870, a discourse label model adjustment module 880 and a user discourse end event detection module 890.

The question answering recording module 810 collects the user dialog log to record the question answering information of the user and the internet question answering system. The user dialog log collected by the question answering recording module 810 is recorded into the user dialog log database 140.

The user discourse end event collection module 820 collects the user discourse end event and the event background information. The user discourse end event includes for example but not limited by: (1) a reset-icon-pressed-by-user event; (2) a user transaction event; (3) a user browse event; and (4) an idle-period-over-threshold event. The event background information collected by the user discourse end event collection module 820 includes for example but not limited by, the reset time, the question answering turn record, the user idle period, the user browse record and the user transaction record. The user discourse end event collection module 820 determines that whether the number of the collected discourse end is enough in training the discourse label model.

The discourse label model train model 830 is for training the discourse label model 150. The discourse label model train model 830 takes the user discourse end events and the dialog log recorded in the user dialog log database 140 as the training data.

The online sentence discourse labeling module 840 labels the user question real-time as DC or DE based on the trained discourse label model 150 and also labels the confidence value.

If the current-turn user question is labeled as DE, the discourse clearing and answering module 850 clears the discourses of the old boundary and answers the user question. If the current-turn user question is labeled as DC, the discourse clearing and answering module 850 does not clear the discourses of the old boundary but answers the user question.

The comparison module 860 compares the match degree between the next-turn user question and the old boundary. If the comparison module 80 determines that the next-turn user question matches with the old boundary, it is wrong to label the current-turn user question as DE. Based on determination result of the comparison module 860, the discourse label correction module 870 determines whether to correct the discourse of the current-turn user question as DE as DC.

The discourse label model adjustment module 880 adjusts the discourse label model 150.

The user discourse end event detection module 890 determines whether the user discourse end event is detected. As described above, the user discourse end event includes for example but not limited by: (1) a reset-icon-pressed-by-user event; (2) a user transaction event; (3) a user browse event; and (4) an idle-period-over-threshold event. The user discourse end event detection module 890 detects that whether the user actives ends the discourse.

If the online sentence discourse labeling module 840 labels the current-turn user question as DC but the user discourse end event detection module 890 detects the appearance of the user discourse end event, it is wrong that the online sentence discourse labeling module 840 labels the current-turn user question real-time as DC. The discourse label correction module 870 corrects the discourse label (DC) of the previous-turn user question as DE.

Figure 9:
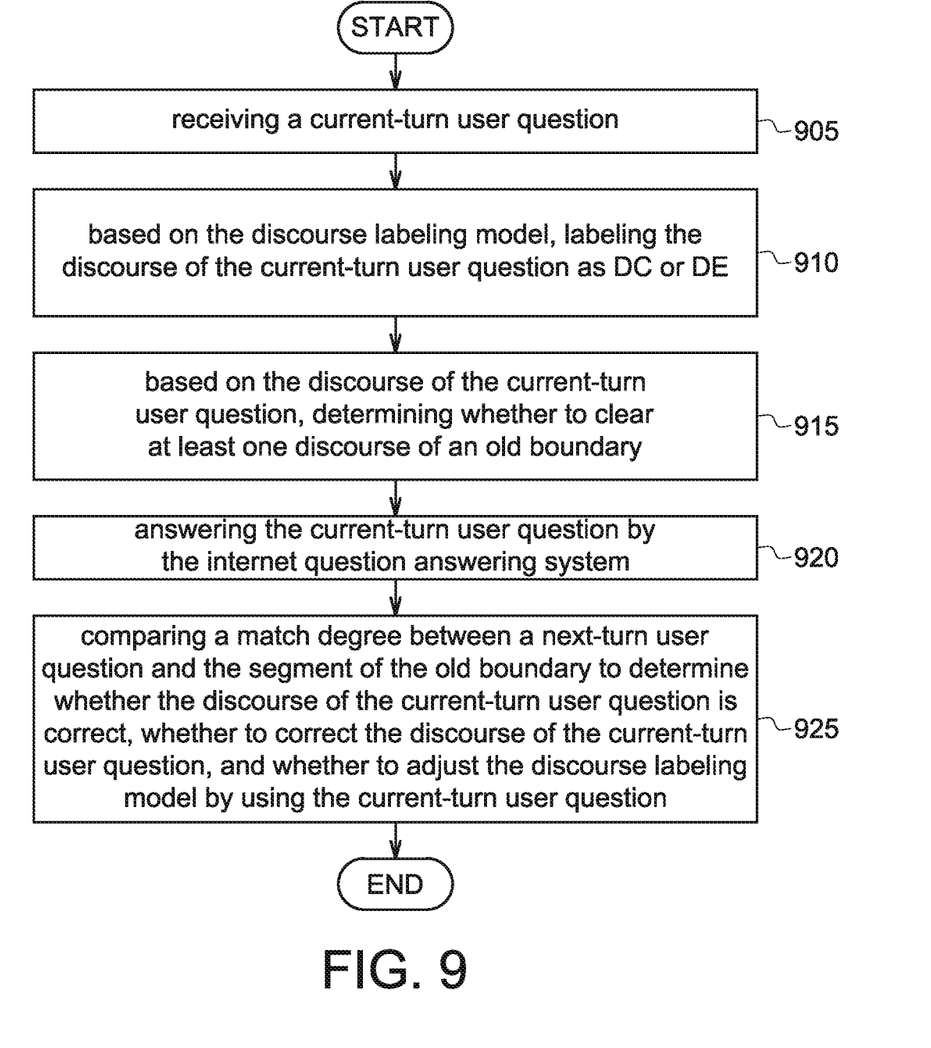
FIG. 9 shows a flow of the internet question answering method according to another embodiment of the application.

FIG. 9 shows a flow of the internet question answering method of another embodiment of the application. In step 905, a current-turn user question is received. In step 910, based on the discourse labeling model, the discourse of the current-turn user question is labeled as "discourse continue" or "discourse end". In step 915, based on the discourse of the current-turn user question, whether to clear at least one discourse of an old boundary is determined. In step 920, the internet question answering system answers the current-turn user question. In step 925, a match degree between a next-turn user question and the segment of the old boundary is compared to determine whether the discourse of the current-turn user question is correct, whether to correct the discourse of the current-turn user question, and whether to adjust the discourse labeling model by using the current-turn user question.

Figure 10:
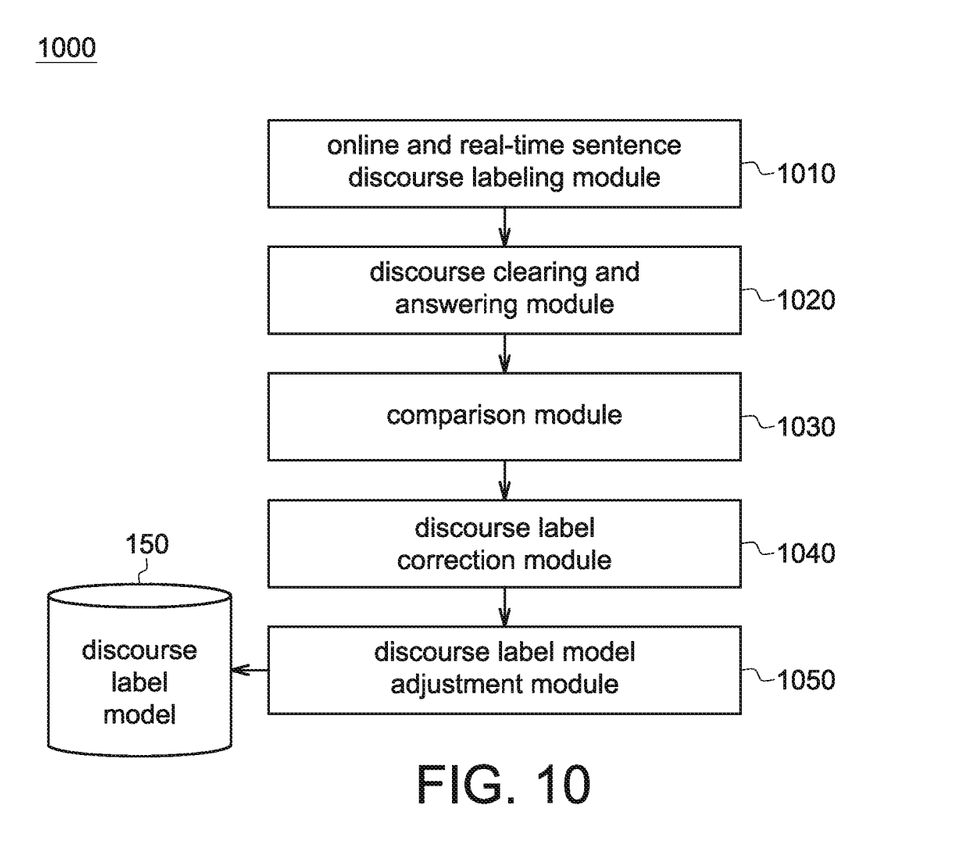
FIG. 10 shows a function block diagram of the internet question answering system according to yet another embodiment of the application.

FIG. 10 shows a function block diagram of the internet question answering system of yet another embodiment of the application. The internet question answering system 1000 includes an online and real-time sentence discourse labeling module 1010, a discourse clearing and answering module 1020, a comparison module 1030, a discourse label correction module 1040 and a discourse label model adjustment module 1050.

The online and real-time sentence discourse labeling module 1010 labels a discourse of the current-turn user question as DC or DE online and real-time on the discourse label model 150.

The discourse clearing and answering module 1020 determines whether to clear at least one discourse of an old boundary based on the discourse of the current-turn user question. The discourse clearing and answering module 1020 also answers the current-turn user question.

The comparison module 1030 compares the match degree between the next-turn user question and the old boundary to determine whether the labeled discourse of the current-turn user question is correct or not.

The discourse label correction module 1040 determines whether to correct the discourse of the current-turn user question based on a determination result of the comparison module 1030.

The discourse label model adjustment module 1050 determines whether the current-turn user question is used in adjusting the discourse label model based on the determination result of the comparison module 1030.

Another embodiment of the application further discloses a non-transitory computer-readable recording media which stores a program. When a computer loads and executes the program, the internet question answering method as described above is executed.

The prior internet question answering system (such as Wolfram Alpha) and the search engine (for example, Google) provides a single-turn question answering service, but the dialog log is not kept and the user dialog log is not considered. Thus, when the user asks questions, the user has to input the complete question information, which is not friendly to user. On the contrary, the internet question answering system according to the embodiments of the application will collect and analyze the user historic interaction question answering behaviors. Thus, even if the user does not provide complete question information, the internet question answering system according to the embodiments of the application still answers the user question precisely. Thus, the internet question answering system according to the embodiments of the application is friendly to users.

Further, the current intelligent agent service (for example, VoiceBox, Siri) keeps the user historic dialog for providing intelligent question answering model. However, the answers from the current intelligent agent service may conflict with the user question and thus the answers are not precise enough. On the contrary, the internet question answering system according to the embodiments of the application collect and analyze the user historic interaction question answering behaviors, and automatically detects the discourse boundary and automatically resets/clears the user historic dialog status. Thus, the internet question answering system according to the embodiments of the application may reduce the semantic conflict due to different intentions during dialog and provide intelligent question answering experience.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An internet question answering method for an internet question answering system having a display, the internet question answering method including:

receiving and displaying a current-turn user question on the display of the internet question answering system;

labeling a discourse of the current-turn user question as "discourse continue (DC)" or "discourse end (DE)" online and real-time based on a discourse labeling model;

determining whether to clear at least one discourse of an old boundary based on the discourse of the current-turn user question;

on-line feeding back an answer to the current-turn user question on the display by the internet question answering system; and evaluating a degree of matching between a next-turn user question and the old boundary to determine whether the discourse of the current-turn user question is correct, whether to correct the discourse of the current-turn user question, and whether to adjust the discourse labeling model by using the current-turn user question, wherein when the discourse of the current-turn user question is corrected based on the degree of matching between the next-turn user question and the old boundary evaluated by said evaluating, the discourse labeling model is on-line adjusted based on the corrected discourse of the current-turn user question;

when the discourse of the current-turn user question is labeled as DE, the discourses in the old boundary are cleared, and a dialog log and the discourses in the old boundary are ignored in answering the next-turn user question; and DE is determined by the internet question answering system, or DE is triggered by a user discourse end event and detected by the internet question answering system.

2. The internet question answering method according to claim 1, wherein in labeling the discourse of the current-turn user question online and real-time, a corresponding confidence value of the discourse is labeled.

3. The internet question answering method according to claim 1, wherein the step of clearing the at least one discourse of the old boundary includes clearing an information of the at least one discourse of the old boundary, the information of the at least one discourse including a linguistic text information and a meta information;

the linguistic text information includes at least one sentence of a boundary, and a keyword, a morphological feature, a semantic concept, a sentence type and implied topics of the at least one sentence; and the meta information includes a discourse end time, a user idle period, a user browse record, a transaction record of the at least one discourse.

4. The internet question answering method according to claim 1, wherein if the next-turn user question and the old boundary is determined to be matched, determination is made that it is wrong to label the current-turn user question as DE, and the discourse of the current-turn user question is corrected from DE as DC.

5. The internet question answering method according to claim 1, further comprising:

if the discourse of the current-turn user question is labeled as DC, detecting whether the user discourse end event appears.

6. The internet question answering method according to claim 5, wherein if the discourse of the current-turn user question is labeled as DC and the user discourse end event appears, the discourse of the current-turn user question is corrected from DC as DE.

7. The internet question answering method according to claim 6, wherein the user discourse end event includes any one or a combination thereof: a reset-icon-pressed-by-user event; a user transaction event; a user browse event; and an idle-period-over-threshold event.

8. The internet question answering method according to claim 1, further including:

training the discourse label model.

9. The internet question answering method according to claim 8, wherein the step of training the discourse label model further includes:

collecting a user dialog log in a user dialog log database; and collecting the user discourse end event and an event background information.

10. The internet question answering method according to claim 9, wherein the event background information includes any one or any combination of: a reset time, a question answering turn record, a user idle period, a user browse record and a user transaction record.

11. A non-transitory computer-readable recording media storing a program, wherein when a computer loads and executes the program, the internet question answering method according to claim 1 is executed.

12. An internet question answering system including:

a display for displaying a current-turn user question;

an online and real-time sentence discourse labeling module, for labeling a discourse of the current-turn user question as "discourse continue (DC)" or "discourse end (DE)" online and real-time based on a discourse label model;

a discourse clearing and answering module, for determining whether to clear at least one discourse of an old boundary based on the discourse of the current-turn user question, and for on-line feeding back an answer to the current-turn user question on the display;

a comparison module, for evaluating a degree of matching between a next-turn user question and the old boundary to determine whether the labeled discourse of the current-turn user question is correct or not;

a discourse label correction module, for determining whether to correct the discourse of the current-turn user question based on a determination result of the comparison module; and a discourse label model adjustment module, for determining whether the current-turn user question is used in adjusting the discourse label model based on the determination result of the comparison module, wherein when the discourse label correction module determines to correct the discourse of the current-turn user question based on the degree of matching between the next-turn user question and the old boundary evaluated by the comparison module, the discourse labeling model is on-line adjusted based on the corrected discourse of the current-turn user question;

when the discourse of the current-turn user question is labeled as DE, the discourse clearing and answering module clears the discourses in the old boundary, and the discourse clearing and answering module ignores a dialog log and the discourses in the old boundary in answering the next-turn user question; and DE is determined by the online and real-time sentence discourse labeling module, or DE is triggered by a user discourse end event and detected by the internet question answering system.

13. The internet question answering system according to claim 12, wherein the online and real-time sentence discourse labeling module labels a corresponding confidence value of the discourse.

14. The internet question answering system according to claim 12, wherein the discourse clearing and answering module clears an information of the at least one discourse of the old boundary, the information of the at least one discourse including a linguistic text information and a meta information;

the linguistic text information includes at least one sentence of boundary, and a keyword, a morphological feature, a semantic concept, a sentence type and implied topics of the at least one sentence; and the meta information includes a discourse end time, a user idle period, a user browse record, a transaction record of the at least one discourse.

15. The internet question answering system according to claim 12, wherein if the comparison module determines that the next-turn user question and the old boundary are matched, the comparison module determines that it is wrong to label the current-turn user question as DE, and the discourse label correction module corrects the discourse of the current-turn user question from DE as DC.

16. The internet question answering system according to claim 12, further comprising a user discourse end event detection module, for detecting whether the user discourse end event appears if the discourse of the current-turn user question is labeled as DC.

17. The internet question answering system according to claim 16, wherein if the online and real-time sentence discourse labeling module labels the discourse of the current-turn user question as DC and the user discourse end event detection module detects appearance of the user discourse end event, the discourse label correction module corrects the discourse of the current-turn user question from DC as DE.

18. The internet question answering system according to claim 17, wherein the user discourse end event includes any one or a combination thereof: a reset-icon-pressed-by-user event; a user transaction event; a user browse event; and an idle-period-over-threshold event.

19. The internet question answering system according to claim 12, further including:

a discourse label model train module, for training the discourse label model.

20. The internet question answering system according to claim 19, further including:

a question answering recording module, for collecting a user dialog log in a user dialog log database; and a user discourse end event collection module, for collecting the user discourse end event and an event background information.

21. The internet question answering system according to claim 20, wherein the event background information includes any one or any combination of: a reset time, a question answering turn record, a user idle period, a user browse record and a user transaction record.

* * * * *

UNITED STATES PATENT AND TRADEMARK OFFICE
CERTIFICATE OF CORRECTION

Page 1 of 1

PATENT NO. : 10,713,313 B2
APPLICATION NO. : 14/983456
DATED : July 14, 2020
INVENTOR(S) : Min-Hsin Shen, Ching-Hsien Li and Chung-Jen Chiu It is certified that error appears in the above-identified patent and that said Letters Patent is hereby corrected as shown below:

On the Title Page

Item (72) Inventors
Please change the listing of Inventors to read:
-- Min-Hsin Shen, Taichung (TW);
Ching-Hsien Li, Kaohsiung (TW);
Chung-Jen Chiu, Hsinchu County (TW) --

Signed and Sealed this
Thirteenth Day of October, 2020

Andrei Iancu
*Director of the United States Patent and Trademark Office*